(12) United States Patent
Xiong et al.

(10) Patent No.: US 8,339,056 B1
(45) Date of Patent: Dec. 25, 2012

(54) LAMP BALLAST WITH PROTECTION CIRCUIT FOR INPUT ARCING AND LINE INTERRUPTION

(75) Inventors: Wei Xiong, Madison, AL (US); Thomas M. Poehlman, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 364 days.

(21) Appl. No.: 12/817,731

(22) Filed: Jun. 17, 2010

(51) Int. Cl.
*H05B 37/02* (2006.01)
(52) U.S. Cl. ........................ 315/224; 315/291; 315/307
(58) Field of Classification Search .................. 315/224, 315/291, 307, 308, 246, 247, DIG. 5, DIG. 2, 315/DIG. 7
See application file for complete search history.

(56) References Cited

U.S. PATENT DOCUMENTS

| | | | | |
|---|---|---|---|---|
| 5,623,184 A | * | 4/1997 | Rector | 315/102 |
| 7,321,201 B2 | * | 1/2008 | Green et al. | 315/209 R |

* cited by examiner

*Primary Examiner* — David Hung Vu
(74) *Attorney, Agent, or Firm* — Waddey & Patterson, P.C.; Mark J. Patterson; Gary L. Montle

(57) ABSTRACT

An electronic lamp ballast is provided with first and second protection circuits responsive to mains input fault conditions. A controller includes a first input terminal coupled to a power supply circuit and effective to receive a power supply input voltage provided thereby, and a second input terminal coupled to an output sensing circuit and effective to receive a feedback voltage provided thereby. The first protection circuit includes circuitry to sense a fault condition in a mains power input to the ballast and to discharge the power supply input voltage in response to a sensed fault condition. The second protection circuit includes circuitry to sense a discharge of the power supply input voltage to the controller and to discharge the feedback voltage in response to the sensed discharge of the power supply input voltage.

20 Claims, 3 Drawing Sheets

LAMP BALLAST WITH PROTECTION CIRCUIT FOR INPUT ARCING AND LINE INTERRUPTION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference:
None

BACKGROUND OF THE INVENTION

The present invention relates generally to electronic ballasts for powering lamps. More particularly, the present invention relates to program start lamp ballasts with protection circuitry and associated methods for protecting the ballasts from input arcing and line interruption.

Lamp ballasts are typically required to be fully functional, or to otherwise automatically restore lamps to an original operating state, whenever an input power line is arcing or has been interrupted. This is an important reliability feature for electronic ballasts generally, and is even more particularly so for program start ballasts. Good program start ballasts should always reliably start the lamp in accordance with an appropriate preheating process each time after powering off and on.

Referring to FIG. 1, a conventional program start ballast 10 may be described which is designed using an integrated-circuit (IC) driven voltage-fed, half-bridge inverter topology. An input voltage source Vac is coupled to four diodes D1-D4 in a bridge configuration defining an input AC-DC general rectifier and providing a DC output Vdc. A power factor correction (PFC) section is coupled to the diode bridge output and provides a constant DC voltage output V_rail through an electrolytic capacitor C1.

An inverter section includes a pair of switching elements Q1, Q2, which in the conventional example shown are MOSFETs in a half bridge configuration and a main series resonant tank to which one or more lamps La may be coupled to receive output power from the ballast. The resonant tank as shown is formed by a DC blocking capacitor Cdc, a resonant inductor Lrp, and a resonant capacitor Cres. Secondary windings of the resonant inductor Lrs1, Lrs2 are respectively coupled across filaments on either end of each lamp La.

A controller 14 is provided to drive the switching elements Q1, Q2. Capacitors C10, C11 and diodes D11, D12 collectively form a power supply circuit for the controller 14.

In a typical program start application of the ballast 10 as described above, the voltage V_rail charges capacitor C2 to a startup threshold voltage associated with the controller 14. The controller 14 then sets a preheat frequency by which the switching elements Q1, Q2 are driven to preheat the lamp filaments Rf1, Rf2 for a period of time T_pre. After the preheat time T_pre, the controller 14 begins sweeping the drive frequency continuously to ignite the lamp La by using the signal across capacitor C9 that is obtained by voltage sensing circuit block 12. When controller 14 detects breakdown and ignition of the lamp, the controller 14 begins steady-state lamp current control. During steady-state operation, the controller 14 additionally monitors the voltage across the capacitor C9 for overvoltage and end-of-life (EOL) conditions.

Typically the voltage supply Vcc for the controller 14 has two critical threshold voltages, V_startup and V_reset. V_startup is typically larger than V_reset. The voltage supply Vcc for the controller 14 has to be greater than V_reset to initialize the control sequence (e.g., preheat, startup, steady-state operation, abnormal condition control). The controller supply voltage Vcc must further be greater than V_startup to start the oscillations and driving of the switching elements Q1, Q2.

To fully reset the ballast, the controller supply voltage Vcc needs to drop below V_reset and then increase to or above V_reset to fully reset the controller 14 so that the controller 14 can initiate the normal startup sequence after the subsequent power-on. If the supply voltage does not start increasing from V_reset, the controller 14 will not go through the preheat sequence and start the lamp directly. Without the preheat sequence, the lamp may likely be more difficult to ignite, which requires the ballast to provide a much larger output voltage V_c_res to ignite the lamp without preheating the filaments. This large output voltage may cause the voltage across capacitor C9 to be greater than the EOL shutdown threshold voltage, and further cause the permanent shutdown of the controller 14. In this case, the only way to restart the lamp is to recycle the input power to the ballast or remove the lamp.

If there is a short line voltage interruption or occurrence of input arcing, the voltage supply to the controller 14 may not have sufficient time to drop below the reset voltage V_reset. The reason for this is that it takes a relatively long time to discharge the capacitor C1, which is a large electrolytic that can hold a great deal of charge. If the line interruption concludes and power is restored before the supply voltage drops below the reset voltage V_reset, then the main voltage V_rail is going to once again charge up capacitor C2 through resistor R3. As a result the ballast could start the lamp directly without any preheating of the filaments and may possibly shut down because of the large starting voltage needed to break down the lamp.

This shutdown condition can have serious consequences. For example, lightning strikes may cause a circuit breaker to shut off and on very quickly. The circuit breaker shut off/on can generate a line interruption or input arcing, and all of the ballasts linked in. for example. a commercial lighting application would then shut down at the same time during a typical lightning strike.

Therefore, what is needed is to design a protection circuit for abnormal conditions such as lightning strikes in the above example, whereby such a collective shutdown may be prevented. It would be further desirable to design such a protection circuit in a manner so as to minimize its implementation costs.

BRIEF SUMMARY OF THE INVENTION

In accordance with various aspects of the present invention, an electronic ballast is provided with protection circuits and methods for protecting the ballast in the event of input arcing and line interruptions.

In one embodiment, an electronic lamp ballast is provided with first and second protection circuits responsive to mains input fault conditions. A controller includes a first input terminal coupled to a power supply circuit and effective to receive a power supply input voltage provided thereby, and a second input terminal coupled to an output sensing circuit and effective to receive a feedback voltage provided thereby. The first protection circuit includes circuitry to sense a fault condition in a mains power input to the ballast and to discharge the power supply input voltage in response to a sensed fault condition. The second protection circuit includes circuitry to sense a discharge of the power supply input voltage to the controller and to discharge the feedback voltage in response to the sensed discharge of the power supply input voltage.

In another embodiment, an electronic lamp ballast of the present invention is provided with mains input power fault protection. A rectifier circuit provides DC power across positive and negative mains terminals. An inverter circuit having first and second switching elements generates an inverter output at an inverter output terminal between the switching elements. A resonant circuit coupled to the inverter output terminal generates a lamp voltage. A controller generates driver signals for the inverter circuit in accordance with a predetermined operating sequence, and further includes an input terminal associated with a threshold voltage. A power supply circuit includes an energy storage device coupled to the input terminal of the controller, and provides energy stored on the energy storage device to the input terminal of the controller. A fault protection circuit block has circuitry for sensing a fault condition between the positive and negative mains input terminals and discharging the stored energy in response to the sensed fault condition and for the duration of the sensed fault condition. The controller initiates the predetermined operating sequence when the power supply signal received at the input terminal rises from below the threshold voltage to above the threshold voltage.

In another embodiment of the present invention, a method of mains input line protection for an electronic ballast is provided. In a first step of the method, a controller is provided with a first input terminal coupled to a first energy storage device associated with a power supply voltage, a second input terminal coupled to a second energy storage device associated with a feedback voltage, and an output terminal coupled to the bases of first and second inverter switches. The controller is configured to drive the inverter switches in accordance with a predetermined operating sequence.

In a second step, a predetermined fault condition is sensed in a mains power input on the mains power line for the ballast. In a third step, the first energy storage device is discharged in response to the sensed predetermined fault condition and for the duration of the fault condition. In a fourth step, the discharge of the first energy storage device is sensed, and in a fifth step the second energy storage device is discharged in response to the sensed discharge of the first energy storage device.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The term "controller" as used herein may refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein.

Figure 2:
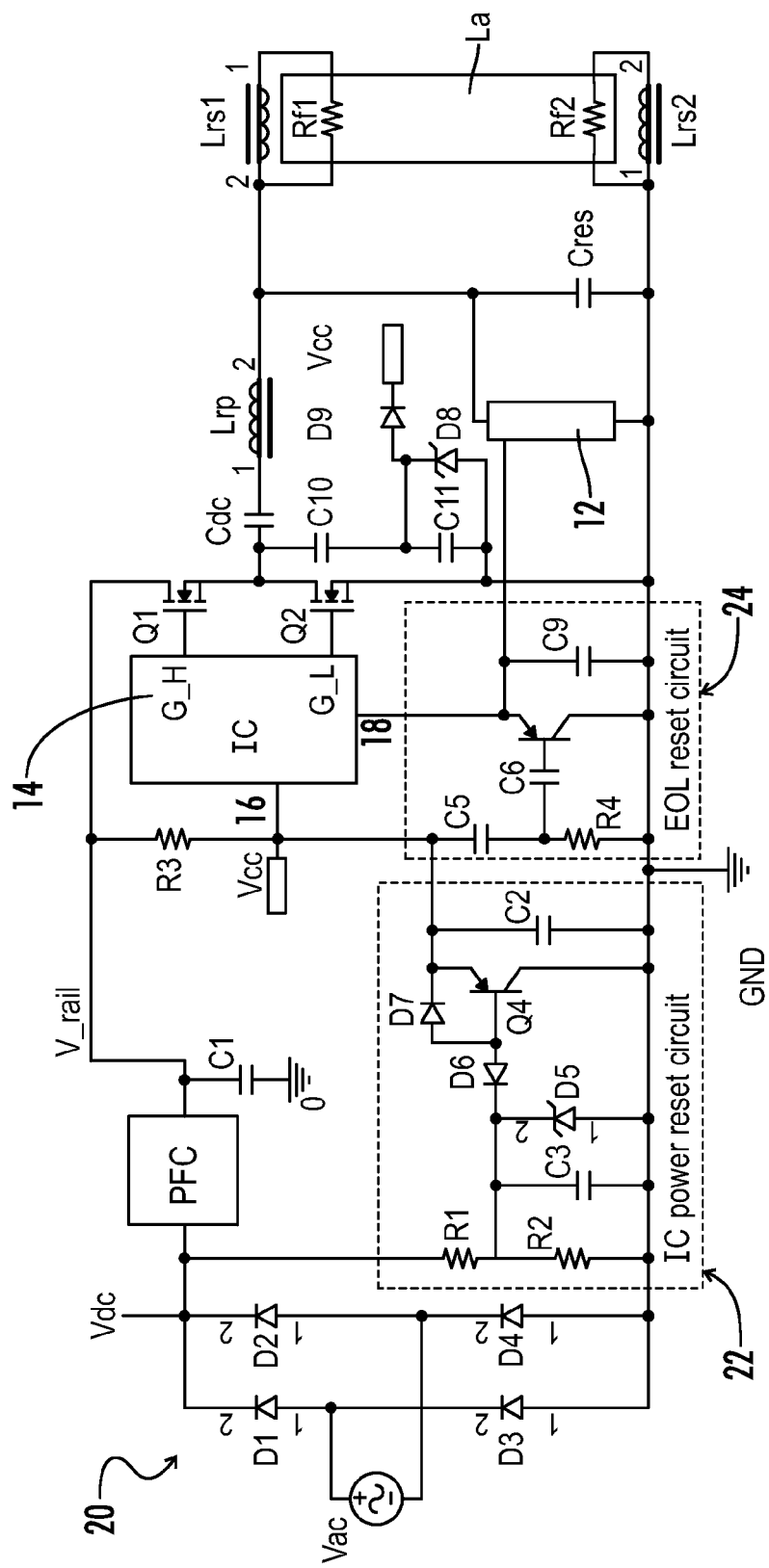
FIG. 2 is a circuit diagram showing an embodiment of the electronic ballast and protection circuitry of the present invention.
Figure 3:
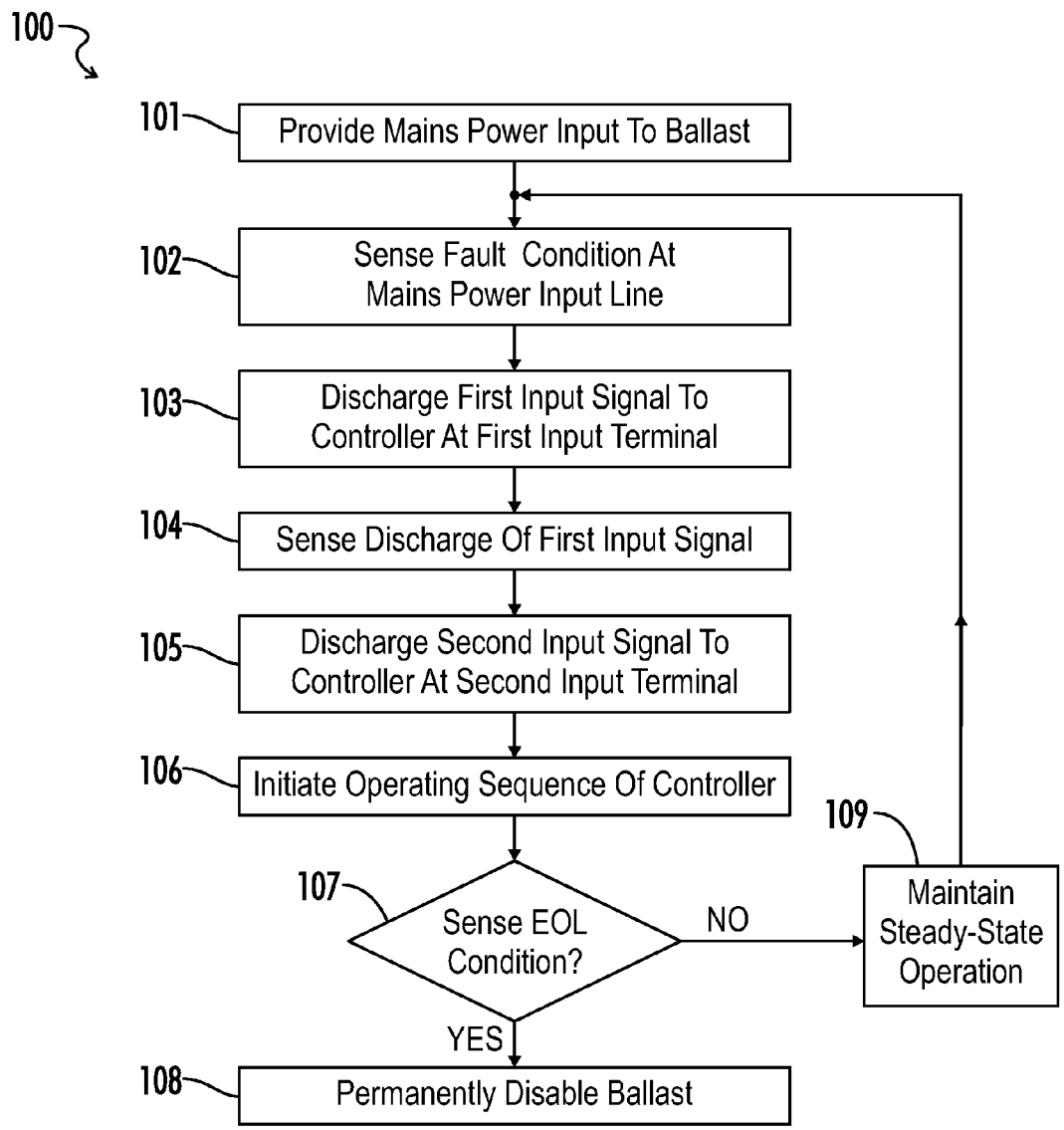
FIG. 3 is a flowchart showing an embodiment of a ballast protection method in accordance with the present invention.

Referring generally to FIGS. 2-3, embodiments of systems and methods in accordance with the present invention may be described herein in some detail. Where the various figures may describe embodiments sharing various common elements and features with other embodiments, similar elements and features are given the same reference numerals and redundant description thereof may be omitted below.

Figure 1:
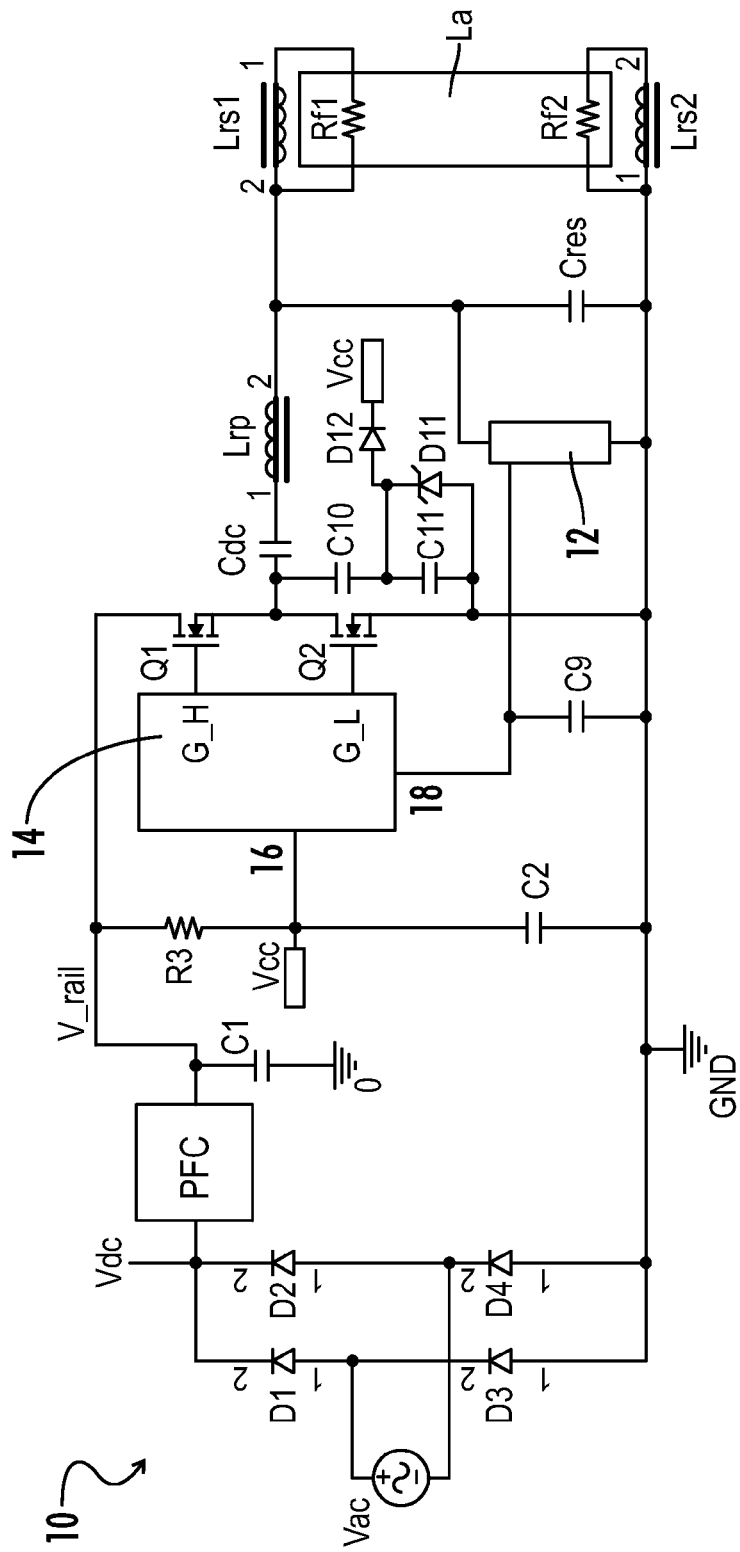
FIG. 1 is a circuit diagram showing an electronic ballast as conventionally known in the art.

Referring first to FIG. 2, an embodiment of an electronic ballast 20 is shown having two additional circuit blocks 22, 24 but otherwise substantially including similar circuitry to that of the electronic ballast 10 of FIG. 1. A first protection circuit block 22, or controller power reset circuit 22, may be used to reset the power supplied to a first input terminal 16 of the controller 14 in case of a sensed predetermined fault condition, such as, for example, an input arc or an interruption on the mains power input line. While in certain embodiments it may be anticipated that only the first protection circuit block 22 is included, a second protection circuit block 24, or EOL reset circuit 24, in an embodiment as shown may be further used to reset the voltage at a second input terminal 18 of the controller 14 whenever the controller power supply resets.

An embodiment of the first protection circuit 22 includes a mains input sensing circuit formed of resistors R1, R2, capacitor C3 and diode D5. Resistors R1, R2 are coupled in series between positive and negative mains power input terminals Vdc, GND, which may in the embodiment shown be further described as positive and negative output terminals of the bridge rectifier D1-D4 coupled to an AC power source Vac. The capacitor C3 is coupled in parallel with the resistor R2, and the diode D5 is further coupled in parallel with the capacitor C3, with both of a first end of the capacitor C3 and the cathode of diode D5 being coupled to a node between the resistors R1, R2, and a second end of capacitor C3 and the anode of diode D5 being coupled to the negative mains terminal GND. Diode D5 may be a zener diode as is known in the art.

Diodes D6, D7 may be provided to protect the base and emitter of switching element Q4. The cathode of diode D6 is coupled to the node between the resistors R1, R2 and the anode of diode D6 is coupled to the base of switching element Q4. The anode of diode D7 is coupled to a node between the anode of diode D6 and the base of switching element Q4, and the cathode of diode D7 is coupled to the emitter of the switching element Q4. The collector of the switching element Q4 may be coupled to the negative mains terminal GND. An energy storage device C2 may be coupled on a first end to the first input terminal 16 of the controller 14 and on a second end to the negative mains terminal GND, such as for example the capacitor C2 as with the conventional configuration as shown in FIG. 1, with the emitter and collector of switching element Q4 being coupled in parallel with the energy storage device C2.

A value for capacitor C3 may be chosen to be relatively small such that the voltage across capacitor C3 generally follows the input line voltage, as may be appreciated by one of skill in the art. However, a value for capacitor C3 may also be selected to large enough to generate a minimum DC voltage that is greater than the power supply voltage Vcc at the first input terminal 16 of the controller 14, such that during standard operating conditions switching element Q4 remains turned off.

Operation of various embodiments of the first protection circuit block 22 may be described in greater particularity below with respect to an embodiment of a method of operation 100 for the electronic ballast 10 generally.

Referring again to an embodiment of the ballast 10 as shown in FIG. 2, the second protection circuit block 24 includes a capacitor C5 coupled on a first end to a node between the energy storage device C2 and the first input terminal 16 of the controller 14, and a resistor R4 coupled in series with capacitor C5 between a second end of capacitor C5 and the negative mains terminal GND. Where the power supply to the first input terminal 16 of the controller 14 (e.g., the stored energy on the capacitor C2) is stable, the voltage across resistor R4 may generally be very small, or substantially zero volts.

A second switching element Q5 is provided, having its emitter coupled to the second input terminal 18 of controller 14 and its collector coupled to the negative mains terminal GND. The base of second switching element Q5 is coupled to a first end of a capacitor C6 having a second end further coupled to a node between capacitor C5 and resistor R4. Capacitor C6 thereby functions to block DC current from the emitter and base of the second switching element Q5 such that during normal operating conditions the second switching element Q5 remains turned off.

A second energy storage device C9 may be coupled in parallel with second switching element Q5, with a first end coupled to the second input terminal 18 of the controller 14 and a second end coupled to the negative mains terminal GND. The second energy storage device C9 coupled in such a manner may be a capacitor C9 as shown in FIG. 1. Further coupled in parallel with capacitor C9 is the lamp output voltage sensing circuit block 12. The particular circuitry of the lamp output voltage sensor 12 is not critical as one of skill in the art would readily appreciate, and various forms of such circuitry may be anticipated within the scope of the present invention.

Referring now to FIG. 3, a method 100 for operation of an electronic ballast 20 as disclosed herein may be further described. In a first step 101, mains input power is provided to the ballast 20. In an embodiment as shown in FIG. 2, this step includes providing power from an AC source Vac to the bridge rectifier circuit and generating a rectified DC power Vdc across positive and negative mains input terminals, but alternatively the ballast 20 may directly receive DC power from an external source. The power factor correction circuit PFC is coupled to the diode bridge output and provides a constant DC voltage output V_rail. The DC voltage V_rail charges energy storage device C2 beyond the reset threshold voltage V_reset and to the startup threshold voltage V_startup associated with the controller 14. The energy stored on the energy storage device C2 is provided to the first input terminal 16, and upon rising from below the reset threshold voltage V_reset to above the reset threshold voltage the operating sequence for the controller 14 is properly initialized. The controller 14 then drives the switching elements Q1, Q2 in accordance with the various predetermined operating modes of the operating sequence.

In one embodiment, the operating modes may include a filament preheat mode, an ignition mode, and a steady-state mode. In the preheat mode, the controller 14 may set a preheat frequency by which the switching elements Q1, Q2 are driven to preheat the lamp filaments Rf1, Rf2 for a period of time T_pre. The preheat time T_pre may be predetermined or may be maintained by the controller 14 until it is triggered to switch operating modes, which either feature being anticipated within the scope of this disclosure. After the preheat time T_pre, the controller 14 in the ignition mode may sweep the drive frequency continuously through a range of frequencies to ignite the lamp La in accordance with a feedback signal stored on energy storage device C9 and provided by the voltage sensing circuit block 12. When the controller 14 detects breakdown and ignition of the lamp, the controller 14 may enter the steady-state operating mode and lowers the switching frequency of the inverter switches for steady-state lamp current control.

While there is no occurrence of a predetermined fault condition, the ballast 20 continues to operate normally. However, in the case of a predetermined fault condition, such as a line interruption or arcing at the mains power input line, the first protection circuit block 22 senses the fault condition (step 102). The voltage across capacitor C3 drops to zero for the duration of a fault condition time period. As soon as the voltage across the capacitor C3 drops below a nominal voltage level, for example the power supply voltage Vcc minus 0.7V, the switching element Q4 starts to conduct and functions to immediately discharge the energy storage device C2 to zero.

When the energy stored on the energy storage device C2 is discharged, the power supply input Vcc to the first input terminal 16 of the controller 14 may be effectively shunted to ground GND (step 103 of the method 100). In various embodiments the power supply input Vcc may remain effectively shunted for the duration of the sensed fault condition. This will fully reset the controller 14 and ensure initialization of the operating sequence in case of the occurrence of a predetermined fault condition.

In various embodiments, the method 100 may continue in step 104 by sensing the discharge of the energy storage device C2 in the second protection circuit block 24. More particularly, the capacitor C5 and resistor R4 sense the instability of the power supply signal Vcc which drops extremely rapidly and induces a differential negative voltage across the resistor R4 and negative current through DC-blocking capacitor C6. This negative current will turn on the second switching element Q5, which in an embodiment may be a PNP-type transistor, and energy stored on the second energy storage device C9 may then immediately be discharged.

When the energy stored on the second energy storage device C9 is discharged, the feedback signal to the second input terminal 18 of the controller 14 may be effectively shunted to ground GND (step 105 of the method 100). The feedback signal in various embodiments is an lamp end-of-life (EOL) sensing voltage which may improperly cause permanent disabling of the ballast if remaining charge on the second energy storage device is not discharged. Therefore, the shunting of the feedback signal to ground may fully reset the EOL sensing voltage and clear remaining charge from any previous shutdown such that remaining charge in the energy storage device will not affect the starting voltage control and EOL sensing after the next power on, further improving the reliability of ballast startup.

In certain embodiments, a method 100 of operation in accordance with the present invention may alternatively skip steps 104 and 105.

Having reset the controller power supply by shunting the power supply to the first input terminal 16 below V_reset, the method continues in step 106 by initializing the operating sequence when the voltage V_rail provided by the PFC circuit again charges energy storage device C2 beyond the reset threshold voltage V_reset and to the startup threshold voltage V_startup associated with the controller 14.

During steady-state operation, the controller 14 additionally monitors the energy stored on the second energy storage device C9 for overvoltage and end-of-life (EOL) conditions (step 107). If during the course of the operating sequence the feedback signal to the second input terminal 18 of the controller 14 exceeds the EOL sensing voltage threshold, the method 100 continues in step 108 by terminating oscillation of the inverter switches Q1, Q2 and permanently disabling the ballast 20. Otherwise, the operating sequence concludes with steady-state mode and the controller 14 simply maintains steady-state operation until power is terminated to the ballast or a predetermined fault condition is sensed, whereby the method 100 returns to step 102.

The previous detailed description has been provided for the purposes of illustration and description. Thus, although there have been described particular embodiments of the present invention of a new and useful "Lamp Ballast with Protection Circuit for Input Arcing and Line Interruption," it is not intended that such references be construed as limitations upon the scope of this invention except as set forth in the following claims.

What is claimed is:

1. An electronic lamp ballast comprising:
   a controller having
      a first input terminal coupled to a power supply circuit and effective to receive a power supply input voltage provided thereby and
      a second input terminal coupled to an output sensing circuit and effective to receive a feedback voltage provided thereby;
   a first protection circuit block having circuitry functional to sense a fault condition in a mains power input to the ballast and to shunt the power supply input voltage to ground in response to said sensed fault condition; and
   a second protection circuit block having circuitry functional to sense a shunting to ground of the power supply input voltage to the controller, and to shunt the feedback voltage to ground in response to said sensed shunting to ground of the power supply input voltage.

2. The ballast of claim 1, the fault condition further comprising an electrical arc associated with the mains power input to the ballast.

3. The ballast of claim 2, the fault condition further comprising one or more of an electrical arc associated with the mains power input to the ballast and a power interruption associated with the mains power input to the ballast.

4. The ballast of claim 3, the controller further comprising a predetermined threshold voltage and configured to initiate a preheat operating mode when the power supply input voltage rises from below the predetermined threshold voltage to above the predetermined threshold voltage.

5. The ballast of claim 4 further comprising:
   the power supply circuit further including a first energy storage device coupled to the first input terminal of the controller;
   the first protection circuit further comprising
      a first switching element having an emitter and a collector coupled across the first energy storage device, and
      a mains input sensing circuit coupled across a base and the collector of the first switching element; and
   wherein the first switching element is functional to begin conducting and thereby discharge the first energy storage device when a fault condition is sensed by the mains input sensing circuit.

6. The ballast of claim 5, the first energy storage device comprising a capacitor coupled between the first input terminal of the controller and a ground terminal.

7. The ballast of claim 6, the first protection circuit functional to discharge the power supply input voltage to below the predetermined threshold voltage in response to a sensed fault condition.

8. The ballast of claim 7, the first protection circuit functional to discharge the power supply input voltage to below the predetermined threshold voltage for the duration of the sensed fault condition.

9. The ballast of claim 5, the second protection circuit further comprising:
   a second energy storage device coupled to a node between the second input terminal of the controller and the output sensing circuit;
   a second switching element having an emitter and a collector coupled across the first energy storage device;
   a power supply input sensing circuit coupled across a base and the collector of the second switching element; and
   wherein the second switching element is functional to begin conducting and thereby discharge a voltage stored in the second energy storage device when a discharge of the power supply input is sensed by the power supply input sensing circuit.

10. The ballast of claim 9, the second energy storage device comprising a capacitor coupled between the second input terminal of the controller and the ground terminal.

11. An electronic ballast for a discharge lamp comprising:
   a rectifier circuit coupled to an AC power source and effective to generate a mains DC power across positive and negative mains terminals;
   an inverter circuit having first and second switching elements and effective to generate an inverter output at an inverter output terminal between the switching elements;
   a resonant circuit coupled to the inverter output terminal and effective to generate a lamp voltage;

a controller effective to generate driver signals for the inverter circuit in accordance with a predetermined operating sequence, the controller further comprising an input terminal associated with a threshold voltage;

a power supply circuit comprising an energy storage device coupled to the input terminal of the controller, the power supply circuit effective to provide energy stored on the energy storage device to the input terminal of the controller;

a fault protection circuit block having circuitry configured to sense a fault condition between the positive and negative mains input terminals and to discharge the stored energy in response to said sensed fault condition and for the duration of said sensed fault condition; and wherein the controller initiates the predetermined operating sequence when the power supply signal received at the input terminal rises from below the threshold voltage to above the threshold voltage.

12. The ballast of claim 11, the fault condition further comprising one or more of an electrical arc and a line interruption associated with the mains DC power across the mains input terminals.

13. The ballast of claim 12, the protection circuit further comprising:

a switching element having an emitter and a collector coupled across the energy storage device;

a mains input sensing circuit coupled across a base and the collector of the first switching element; and wherein the switching element is configured to begin conducting and thereby discharge the energy storage device when a fault condition is sensed by the mains input sensing circuit.

14. The ballast of claim 13, the energy storage device comprising a capacitor coupled between the input terminal of the controller and the negative mains terminal.

15. The ballast of claim 14, the input terminal of the controller and the protection circuit further comprising a first input terminal of the controller and a first protection circuit, respectively, the ballast further comprising:

a second input terminal of the controller associated with a second threshold voltage;

a lamp voltage detection circuit effective to generate a feedback voltage to the second input terminal of the controller indicative of the lamp voltage;

a second protection circuit block having circuitry functional to sense a discharge of the power supply signal to the controller and to discharge the feedback voltage in response to said sensed discharge of the power supply signal; and wherein the controller is functional to disable the ballast in response to a voltage at the second input terminal exceeding the second threshold voltage.

16. The ballast of claim 15, the second protection circuit further comprising:

a second capacitor coupled between the second input terminal of the controller and the negative mains terminal;

a second switching element having an emitter and a collector coupled across the first capacitor;

a power supply signal sensing circuit coupled across a base and the collector of the second switching element;

wherein the second switching element is functional to begin conducting and thereby discharge a voltage stored in the second capacitor when a discharge of the power supply signal is sensed by the power supply signal sensing circuit; and wherein the feedback voltage is discharged from the second input terminal.

17. A method of providing mains input line protection for an electronic ballast, the method comprising:

providing a controller with a first input terminal coupled to a first energy storage device associated with a power supply voltage, a second input terminal coupled to a second energy storage device associated with a feedback voltage, and an output terminal coupled to the bases of first and second inverter switches, the controller configured to drive the inverter switches in accordance with a predetermined operating sequence;

sensing a predetermined fault condition in a mains power input on the mains power line for the ballast;

discharging the first energy storage device in response to the sensed predetermined fault condition and for the duration of the fault condition;

sensing the discharge of the first energy storage device; and discharging the second energy storage device in response to the sensed discharge of the first energy storage device.

18. The method of claim 17, wherein the controller is configured to initiate the operating sequence when an input power supply voltage at the first input terminal rises from below a first threshold voltage to above the first threshold voltage, and wherein the operating sequence further comprises a filament preheat operating mode, a lamp ignition operating mode, and a steady state operating mode.

19. The method of claim 18, further comprising the steps of detecting at the second input terminal an EOL condition associated with an input feedback voltage being above a second threshold voltage; and permanently disabling the ballast in response to the detected EOL condition.

20. The method of claim 19, the predetermined fault condition further comprising an electrical arc or line interruption associated with the mains power input on the mains power line.

* * * * *